(12) United States Patent
Vigen

(10) Patent No.: US 10,116,803 B1
(45) Date of Patent: Oct. 30, 2018

(54) SYSTEM AND METHOD OF REROUTING A TOLL FREE TELEPHONY CALL IN THE EVENT OF THE FAILURE TO CONNECT TO THE TARGET TELEPHONY STATION

(71) Applicant: Airespring, Inc., Van Nuys, CA (US)

(72) Inventor: Eric Arno Vigen, Woodland Hills, CA (US)

( * ) Notice: Subject to any disclaimer, the term of this patent is extended or adjusted under 35 U.S.C. 154(b) by 0 days.

(21) Appl. No.: 15/939,189

(22) Filed: Mar. 28, 2018

(51) Int. Cl.
  *H04M 7/00* (2006.01)
  *H04L 12/24* (2006.01)
  *H04L 29/06* (2006.01)
  *H04M 15/00* (2006.01)

(52) U.S. Cl.
  CPC ...... *H04M 7/0084* (2013.01); *H04L 41/0654* (2013.01); *H04L 65/1046* (2013.01); *H04M 15/56* (2013.01)

(58) Field of Classification Search
  CPC . H04M 7/0084; H04M 15/56; H04L 41/0654; H04L 65/1046
  USPC ................................................. 379/221.04
  See application file for complete search history.

(56) References Cited

U.S. PATENT DOCUMENTS

| | | | |
|---|---|---|---|
| 4,797,915 A | 1/1989 | Bowker | |
| 4,866,763 A | 9/1989 | Cooper | |
| 5,570,417 A | 10/1996 | Byers | |
| 5,581,543 A | 12/1996 | Natarajan | |
| 6,137,877 A * | 10/2000 | Robin | H04M 15/00 379/114.24 |
| 6,614,781 B1 * | 9/2003 | Elliott | H04L 12/6418 370/352 |
| 6,975,717 B1 | 12/2005 | Smith | |
| 7,031,450 B2 | 4/2006 | Evslin | |
| 7,042,998 B2 | 5/2006 | Zino | |
| 7,295,665 B2 | 11/2007 | Plunkett | |
| 7,864,665 B2 | 1/2011 | Shei | |
| 8,000,318 B2 | 8/2011 | Wiley | |
| 8,290,137 B2 | 10/2012 | Yurchenko | |
| 9,025,438 B1 | 5/2015 | Palmer | |
| 9,667,802 B2 | 5/2017 | Dwarkha | |

* cited by examiner

*Primary Examiner* — Quynh H Nguyen
(74) *Attorney, Agent, or Firm* — Rod Rummelsburg

(57) ABSTRACT

A system and method of re-routing a toll free telephony call if an interexchange carrier is unable to connect the toll free call to a target telephony station. A routing server accesses a primary and auxiliary routing database to retrieve a plurality of routing codes, including a primary routing code associated with an interexchange carrier computer, to which the routing server can route the toll free call to via an access tandem. If the routing server receives a status back from the access tandem indicating the toll free call did not complete, the routing server dynamically re-routes the toll free call based on one or a plurality of previously accessed routing codes. Such re-routing shall occur via the access tandem or via a voice over Internet Protocol provider server.

11 Claims, 6 Drawing Sheets

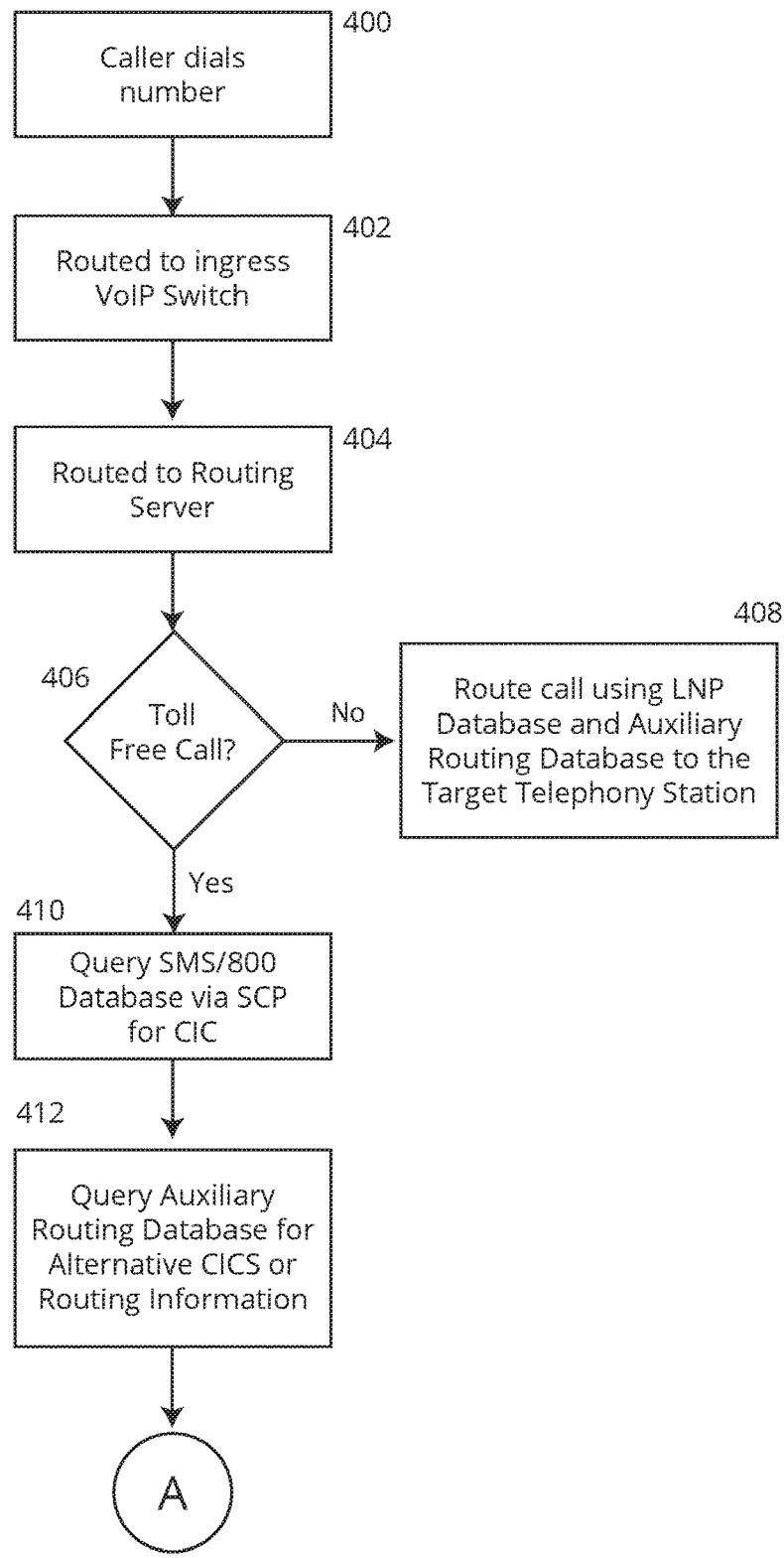

Fig. 5

| | Toll Free Number Format: 8XX - NNN-NNNN | Route 1 | Route 2 | Route 3 | Route 4 |
|---|---|---|---|---|---|
| 500a | 800-222-1234 | 4631 | 0231 | - | - |
| 500b | 888-222-4321 | 216.9.128.4 | 223.3.128.2 | - | - |
| 500c | 877-378-1111 | - | - | - | - |
| 500d | 866-378-2222 | 2dol:3cd8:0e33:4a88:0000:0000:1234:9cdl | - | - | - |
| 500e | 844-631-4455 | mycomputer.cuc.com | - | - | - |
| 500f | 855-621-4000 | Alias - 1 | Alias - 2 | - | - |

Columns: 502, 504, 506, 508, 510

SYSTEM AND METHOD OF REROUTING A TOLL FREE TELEPHONY CALL IN THE EVENT OF THE FAILURE TO CONNECT TO THE TARGET TELEPHONY STATION

TECHNICAL FIELD

This invention relates to the routing a long distance toll free ("TF") telephony call and re-routing of such call in the event of a failure of the call to complete.

BACKGROUND

The routing of a toll free ("TF") telephony call in North America is determined by a single toll free number ("TFN") database ("SMS/800 Database"). A telephony call is sometimes referred to herein as a "call" or "telephony call." The SMS/800 Database is administrated under authority of the Federal Communications by Somos Inc. ("Somos"), formerly known as SMS/800, Inc. The SMS/800 Database is updated by responsible organizations ("Responsible Organizations" or "RespOrgs") who operate in accordance of SMS/800 Database guidelines promulgated by Somos. The RespOrgs are responsible for administering TFNs acquired by them from Somos or transferred to them from other RespOrgs. For each such TFN the RespOrg is charged with updating the SMS/800 database, as applicable. Important fields in the SMS/800 Database include the TFN, RespOrg identifier ("RespOrg ID") associated with the TFN, and a carrier identification code ("CIC") that identifies a carrier to which an access tandem will often route the TF telephony call over a network for an inter-LATA telephony call. The TFN record information input by the RespOrg into the SMS800 Database is downloaded to appropriate service control points ("SCPs") based on the area of service indicated in the TFN record.

In the legacy time division multiplex ("TDM") telephone network, a TF call travels from the caller's equipment via an Incumbent Local Exchange Carrier ("ILEC") switch at a Central Office ("CO") local to where the TF call originated. Either the CO switch, or an access tandem connected to the CO switch, "dips" the SMS/800 Database at a SCP to retrieve a CIC associated with the dialed TFN. Based on the CIC, the ILEC routes the TF call via a TDM access tandem to an interexchange carrier ('IXC") associated with the CIC. The IXC transports the call over its network to the local exchange where the toll free call is completed.

Originally AT&T provided the tandem facilities, called tandems, to which carriers connected at a meet-me point. The AT&T tandem received a TF call, and based on the CIC associated with the TF call, delivered the call to the carrier associated with the CIC. Subsequent to the breakup of the Bell System in 1982, some of the spun off independent Regional Bell Operating companies ('RBOC") grew in part by acquiring, being acquired or merging with other telephone companies. As of today there are only a few primary carriers that own tandem facilities used for routing and transporting TF calls ("Primary Tandem Access Switch Providers"). The Primary Tandem Access Switch Providers include AT&T (name now used by SBC Communications, who acquired AT&T Corporation, Ameritech, Pacific Telesis, SNET and BellSouth), Verizon Communications ("Verizon") (resulting from a merger of Bell Atlantic, NYNEX and GTE), and CenturyLink (who acquired Qwest Corporation, formerly known as Mountain Bell).

Other carriers depend on the Primary Tandem Access Switch Providers for routing and transport of TF calls. In the event of a failure of one or more Primary Tandem Access Service Providers, long distance TF calls routed to such provider(s) will not complete. One recovery option is a manual update of the SMS/800 Database, whereby the RespOrg having responsibility for the affected TFN changes the CIC associated with such TFN to a CIC of an alternate Primary Tandem Access Switch Provider not experiencing a failure. In the case of a catastrophic failure of one or more Primary Tandem Access Switch Providers, potentially millions of TF telephony calls will fail to complete. Updates of the SMS/800 Database after a toll free call fails to complete is not a time-efficient solution, particularly from the perspective of the caller.

An Internet ("VoIP") service provider ("VoIP Service Provider"), sometimes referred to herein as a telephony service provider or a service provider, may not have an ability to originate or terminate a TF call directly to TDM tandems. Such VoIP Service Provider may be dependent, at least in certain instances, on accessing the SMS/800 Database via a SCP to obtain a CIC associated with the TFN. The VoIP Service Provider routes the TF call via an access tandem to the IXC associated with the retrieved CIC. A failure of the Primary Tandem Access Switch Provider to complete a TF call can cause the same problem for a VoIP Service Provider as for other carriers.

Conventional architectures for routing TF telephony calls do not incorporate the ability to efficiently re-route a TF telephony call in the event of failure of the TF call to complete due to a failure at a Primary Tandem Access Switch Provider.

BRIEF DESCRIPTION OF THE DRAWINGS

FIGS. 4A and 4B. Shows a flowchart of an embodiment of a method for routing and, if applicable, re-routing a toll free telephony call.

FIG. 5. Shows a chart of an embodiment of the types of routing codes contained in an auxiliary routing database.

DETAILED DESCRIPTION

Toll free telephony service allows a caller to dial and place a long distance telephony call without being charged for the call. The numbering scheme of the dialed number determines whether or not the dialed number is a toll free number ("TFN"). Currently in North America a ten (10) digit TFN starts with a three (3) digit prefix of 800, 888, 877, 866, 855, or 844. Additional three digit toll free prefixes are anticipated in the future, as approved by the Federal Communications Commission ("FCC") or such agency or third party entity authorized by the FCC to establish or maintain toll free number administration. The owner of the dialed TFN is billed for the call. Generally the owner of the dialed TFN is the recipient of the call, but the toll free call could be directed to other locations and answered by other parties or entities with approval of the TFN owner.

Figure 1:
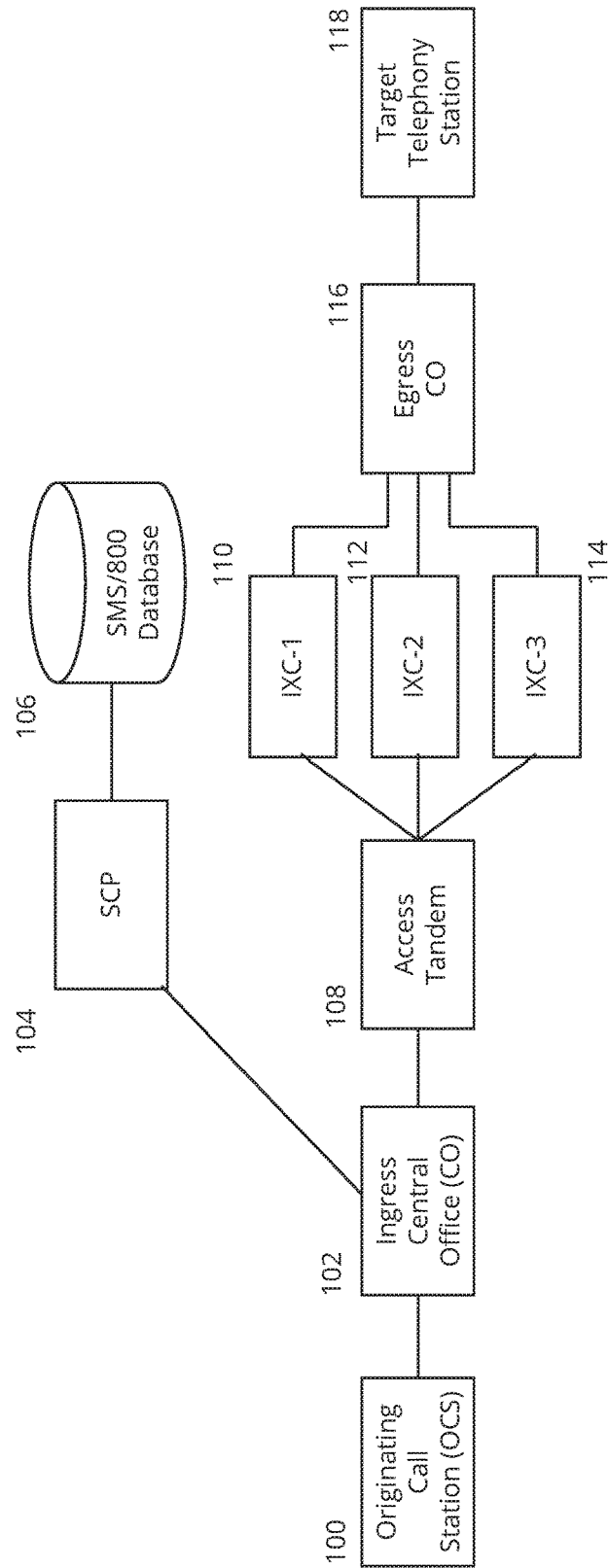
FIG. 1 shows a block diagram of the prior art system for routing a long distance toll free telephony call.

FIG. 1. shows a block diagram of a prior art system for routing a toll free ("TF") call. A TF call is initiated by a caller at an originating call station ("OCS") 100, which may be an electronic machine such as a stationary telephone, mobile phone, facsimile machine, or computer. The TF call is sent to a local ingress Central Office ("CO") computer 102 via a physical line such as a copper or fiber optic line or via a wireless connection. Between the OCS and the ingress CO, the call may traverse through other electrical equipment such as a private branch exchange ("PBX"), router, gateway, or transceiver.

The CO communicates with a service control point ("SCP") 104, a server that accesses a toll free number database called the SMS/800 Database 106. The SMS/800 database contains carrier identification code ("CIC") routing information associated with a TFN. Such CIC routing information is one type of a routing code, and is sometimes referred to herein as the primary routing code. The SMS/800 Database is used for determining routing information for TF numbers based on the CIC routing information associated with a TFN. The SMS/800 Database is sometimes referred to herein as a "routing database" or "first routing database." In communicating with the SCP, the communication to/from the ingress COI could traverse through one or more routers, such as a signal transfer point ("STP") computer.

The CO maintains an electronic connection via wire or fiber to an access tandem 108, a computer that electronically interconnects via wire or fiber line directly or indirectly to one or more interexchange carrier computers, designated here as IXC-1 110, IXC-2 112, and IXC-3 114. The interexchange carrier computers are sometimes referred to herein as "interexchange carrier computing machines." Based on the carrier identification code ("CIC") the CO receives from the SCP as a result of accessing, aka dipping, the SMS/800 Database, the CO sends the TF call electronically to the access tandem, which routes the TF call to one of the interexchange carrier computers based on the CIC. A CIC is a four digit code, used as a routing code, that uniquely identifies a long distance telecommunications carrier. CIC(s) are assigned by the North American Numbering Plan Administration ("NANPA").

The selected interexchange carrier computer will transport the TF call an egress CO computer 116. In going from the interexchange carrier computer to the egress CO, the TF call may optionally transverse other computers, such as routers electronically connected in a network, which also has connectivity to the egress CO.

The egress CO transports the TF call to the target telephony station 118, which may be a stationary telephone, mobile phone, facsimile machine, or computer. Between the egress CO and the target telephony station the TF call may be transported via a physical line such as a copper or fiber optic line or may be transported by wireless means.

Figure 2:
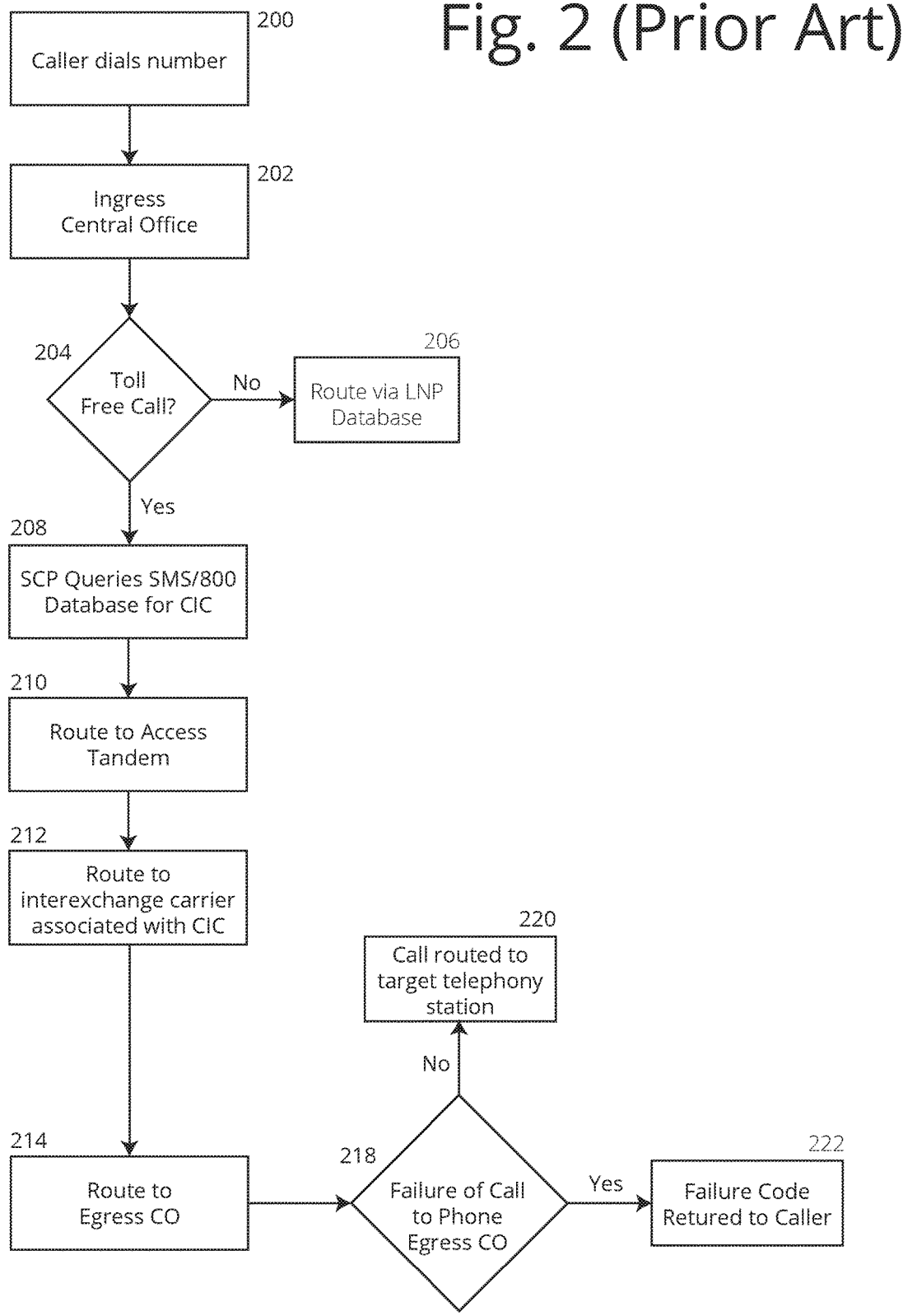
FIG. 2 shows a flowchart of the prior art method of routing a toll free telephony call.

FIG. 2 shows a flowchart of a prior art method for routing a toll free telephony call. From a telephony device, which may be a stationary telephone, mobile phone, or computer softphone, a caller dials a toll free number in order to place a toll free call 200. The toll free call is transported to an ingress CO computer, also known as a switch, 202.

The ingress CO checks the three digit prefix of the dialed TF number to determine whether or not the dialed number is a toll free number 204. If the prefix is not an 800, 888, 877, 866, 855, 844 or such other prefix designed by the FCC to be a TFN prefix, then the ingress CO determines the call is not a TF call and routes it to the intended recipient, i.e. the target telephony station, after dipping a local number portability ("LNP") database to determine how to route the call 206. The ingress CO could route the non-TF call locally through its own switch to the target telephony station if such target telephony station is local and serviced by the ingress CO. Alternately the ingress CO could send the non-TF call via a sector tandem to another CO located in the same local access and transport area ("LATA") in which the caller is located for delivery to the target telephony station if the target telephony station is located in such LATA. For a long distance non-TF call the ingress CO sends the non-TF call via an access tandem to a CO outside of the LATA for delivery to the target telephony station.

If the ingress CO determines the dialed number is a TF number, then the ingress CO dips the SMS/800 Database via a SCP computer to obtain a CIC corresponding to the dialed TF number 208. After receiving the CIC, the ingress CO sends the TF call and CIC to an access tandem 210 via a Feature Group D ("FGD") trunk.

The access tandem forwards the TF call to an interexchange carrier ("IXC") identified by the CIC 212. The IXC routes the TF call over its network to the egress CO serving and local to the TF call recipient, also referred to as the intended recipient or the target telephony station 214. In transporting the TF call from the interexchange carrier to the egress CO, the TF call likely travels over the IXC's network. If the IXC successfully transports the TF call to the egress CO, then the egress CO routes the TF call to the target telephony station 220. If the interexchange carrier is not able to route the TF call to the egress CO 218, then the interexchange carrier returns a failure code 222, also referred to as a "failure status" or a "call completion status indicator," which is routed back to the caller via the access tandem and the ingress CO. The caller may hear an audible failure status, such as a busy signal. The TF call does not complete to the target telephony station.

Figure 3:
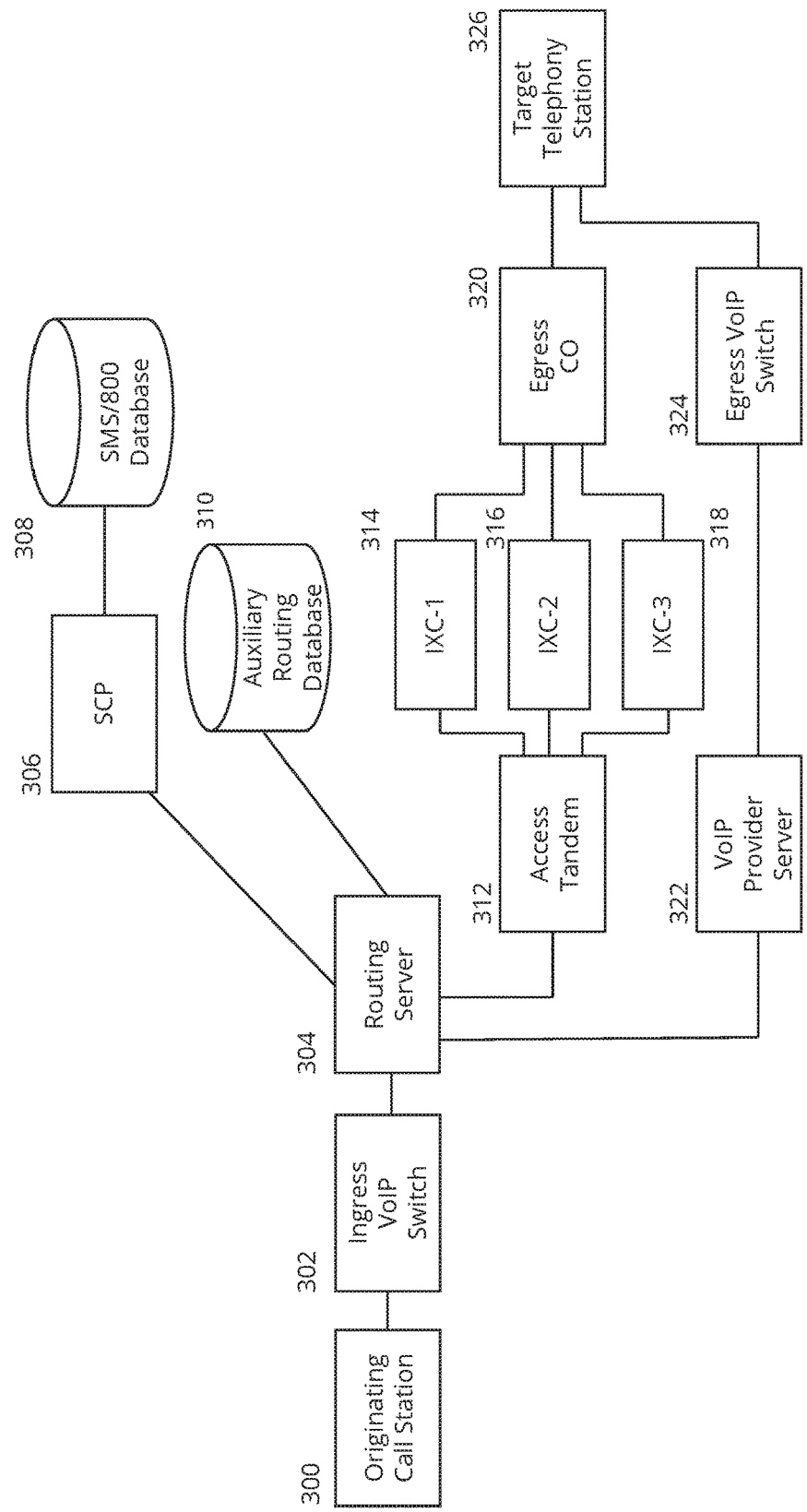
FIG. 3. Shows a block diagram of an embodiment of a system for routing and, if applicable, re-routing a long distance toll free telephony call.

FIG. 3 shows a block diagram of the components of an embodiment of the invention depicting a system for use by a telephony service provider for routing a long distance TF telephony call and, as applicable, rerouting the long distance TF telephony call if it is not able to be completed to the target telephony station due to the failure of an IXC to successfully transport the call. A TF call is placed at an originating call station 300, which may be a stationary telephone, mobile phone, or softphone on a computer. The TF call may be initiated by dialing the TFN associated with a target telephony station. This TFN is sometimes referred to herein as the "called target station identifier." The TF call is transported to an ingress Voice Over Internet Protocol ("VoIP") switch 302. The ingress VoIP switch is an electronic computer switch on the same network or local area network ("LAN") as the originating call station. One skilled in the art will be aware of the ways the originating call station will communicate with the ingress VoIP switch, such as through copper or fiber lines, or wirelessly.

The ingress VoIP switch is connected to a routing server 304. The routing server is sometimes referred to herein as a 'telephony service provider computing machine" or "Provider Machine." The routing server is a computer that performs the functions of i) determining how to route the TF call and ii) routing the TF call to an access tandem or VoIP Service Provider that will forward the call over a network to the target telephony station. The routing server may be on the same network or LAN as the ingress VoIP switch. One skilled in the art will appreciate other embodiments where the routing server is hosted remotely, not on the same LAN as the ingress VoIP switch. In another embodiment the routing server is accessible by the ingress VoIP switch via private or public lines or is accessible wirelessly.

The routing server communicates with a SCP computer 306, which dips a hosted SMS/800 database 308. The hosted SMS/800 database resides on a magnetic or optical medium external to the SCP computer. In another embodiment, the SMS/800 database may be resident or cached in part in the main memory of the SCP computer. The SCP computer returns a CIC associated with the dialed TFN back to the routing server.

The routing server communicates with an auxiliary routing database 310 to obtain an additional routing datum or plurality of additional routing data associated with the dialed TFN. The auxiliary routing database resides on a magnetic or optical medium external to the routing server. In another embodiment the auxiliary routing database may be resident or cached in part in the main memory of the routing server. The auxiliary routing database is sometimes referred to herein as a routing database.

The routing server is connected to an access tandem 312, which is a computer interconnected to one or a plurality of IXC computers, designated as IXC-1 314, ICX-2 316, and IXC-3 318. The access tandem is sometimes referred to herein as an "electronic routing machine." A FGD trunk connects the access tandem to each of the IXC computers. Each of the IXC computers can transport the TF call over a network such as a wide area network to an egress central office ("CO") computer 320, which is located in the same LATA as the target telephony station.

The egress CO computer is connected to a target telephony station 326 through copper or fiber line or is connected wirelessly. The target telephony station may be a stationary telephone, mobile phone, facsimile, computer, electronic sensor, or other electronic device capable of receiving a telephony call.

The routing server is connected to a VoIP provider server 322, which is a computer capable of routing a toll free to the target telephony station based on routing data supplied to it by the routing server. In this embodiment the routing server is connected to the VoIP provider server directly by copper or fiber line. The VoIP provider server is sometimes referred to herein as an "alternate electronic routing machine." In other embodiments the VoIP provider server computer may be physically remote, reachable by private network or the public Internet. The VoIP provider server can send the toll free call over a network to an egress VoIP switch 324, which is located in the same geographic area and on the same network or LAN as the target telephony station. The egress VoIP switch sends the toll free call to the target telephony station.

In one embodiment the "same geographic area" is the geographic area directly served by the egress CO. In other embodiments the same geographic area may be a LATA, city, county, metropolitan statistical area, business campus, or local area served by a VoIP service provider.

Figure 4B:
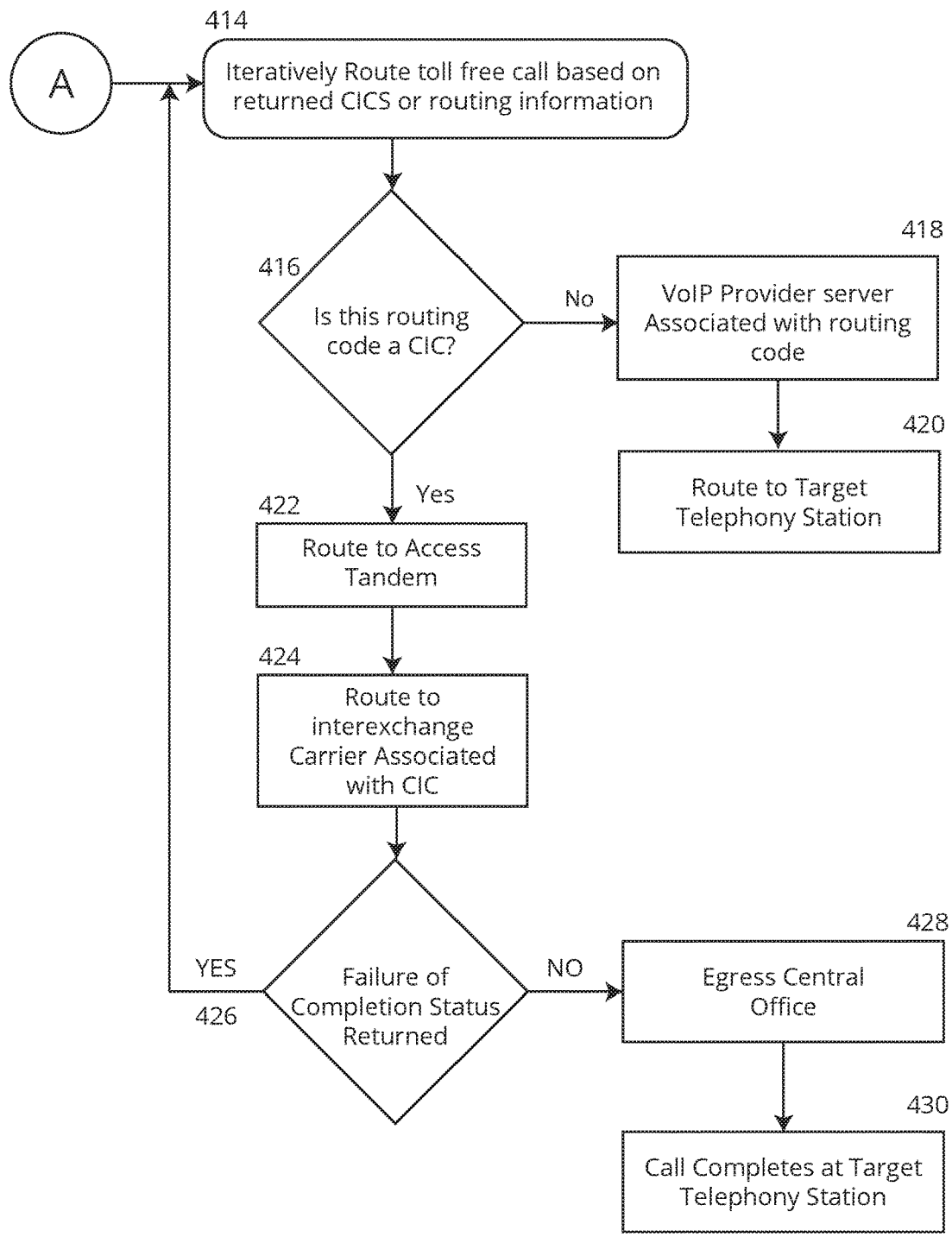

FIGS. 4A and 4B shows a flowchart of an embodiment of the method for routing and re-routing a long distance TF telephony call. A caller dials a TF number 400. The TF call may originate from a stationary telephone, mobile phone, or softphone on a computer. The TF call can be initiated by a human or a machine.

The TF call is routed to an ingress VoIP switch 402, which resides on the same network or LAN as the device from which the TF call is placed. The ingress VoIP switch routes the call to a routing server 404, which will determine the routing and, as applicable, the re-routing of the TF call. The routing server makes a determination whether or not the dialed number is a TF number by examining the three digit prefix 406. If the dialed number has a prefix designated for TF numbers, i.e. an 800, 888, 877, 866, 855, or 844, then the routing server deems the call is a TF call. Otherwise, the routing server decides the call is not a TF call.

If the call is not a TF call, then the routing server dips a local number portability ("LNP") database and auxiliary routing database to obtain routing information and, based on that information, routes the TF call to the target telephony station 408.

If the routing server determines the call is a TF call, the routing server queries the SMS/800 database via a SCP 410. The SMS/800 database, via the SCP, returns to the routing server the CIC associated with the TF number. The routing server also queries an auxiliary routing database for a routing code or a plurality of routing codes, such as additional CIC(s) or Internet Protocol ("IP") address(es) of the target telephony station 412.

In another embodiment, the routing server may query the SMS/800 Database and auxiliary routing database in parallel. In another embodiment the routing server may query the auxiliary routing database prior to the SMS/800 Database, and based on the routing information returned, may elect whether or not to dip the SMS/800 Database. In another embodiment, the SMS/800 Database and the auxiliary routing database are combined into the same database.

The routing server iteratively routes the TF call based differing routing codes until the TF call successfully completes at the target telephony station 414. If the routing server obtains a CIC associated with the TF call 416, the routing server routes the TF call and CIC to an access server 422. The access server routes the TF call to an IXC computer associated with the CIC 424. The IXC computer attempts to route the TF call via an IXC network to an egress central office 428. The egress central office routes the TF call to the target telephony station 430.

If the IXC is unable to route the TF call to the egress central office, the IXC returns a failure of completion status, also referred to as an error code or call completion status indicator, to the routing server 426. The routing server checks if there is an alternate CIC routing code associated with the TF number. If so, then the routing server again routes the TF call to the access tandem, but forwards an alternate CIC routing code to the access tandem in place of the prior CIC routing code.

If the interexchange carrier is unable to successfully route the TF call and the routing server has not received an alternate CIC routing code from its prior dip into the auxiliary routing database, then the routing server routes the TF based on another routing code it has received from the auxiliary routing database. The routing server routes the TF call to a VoIP provider computer 418 that routes the TF call to the target telephony station 420. In this embodiment, the routing code is an IP address, and the call is routed via public Internet to the target telephony station.

One skilled in the art will be aware there are a number of ways to route a TF call via public or private Internet using the IP address of a target telephony station.

In another embodiment, the auxiliary routing database will be distributed to a plurality of geographic locations. There may be a plurality of routing servers that dip the auxiliary routing databases. One skilled in the art will be aware of existing methods to keep the plurality of auxiliary routing databases in sync with each other in the case of updates, modifications, or deletions of records in any one of the auxiliary routing databases.

Methods are known in the existing art to keep an auxiliary routing database in sync with changes to the SMS/800 database. One such method is to compare the date an SMS/800 record has been updated with the date the record(s) for the corresponding TFN has been updated in the auxiliary routing database. If the date of record update in the SMS/800 database is later than the date of an entry in the auxiliary routing database for a given TF number, then the entry(ies) in the auxiliary routing database for the corresponding TF number may no longer be accurate. Such records in the auxiliary routing database will be verified and/or updated.

FIG. 5 shows a chart of the types of routing codes that can be used to populate an embodiment of an auxiliary routing database. These routing codes are sometimes referred to herein as "alternative routing codes", "alternate routing codes", or "auxiliary routing codes". If the routing code consists of a CIC, it may be referred to as an alternative CIC routing code.

The chart shows six records/rows of data. Each record consists of five (5) fields labeled Toll Free Number 502, Route-1 504, Route-2 506, Route-3 508, and Route-4 510. The Toll Free Number field contains a TF number associated with a target telephony station. The Route-1 through Route 4 fields may contain a routing code associated with the TF number. Alternately one or a plurality of the Route-1 through Route-4 fields may be null or blank or may contain an indictor showing no routing code is in the field.

Record 500*a* shows a TF number with TF prefix "800" in the Toll Free Number field. The corresponding Route-1 and Route-2 fields each contain a CIC. The corresponding Route-3 and Route-4 fields are null.

Record 500*b* shows a TF number with TF prefix "888" in the Toll Free Number field. The corresponding Route-1 and Route-2 fields each contain an Internet Protocol version 4 ("IPv4") Internet Protocol ("IP") address. The corresponding Route-3 and Route-4 fields are null.

Record 500*c* shows a TF number with TF prefix "877" in the Toll Free Number field. The corresponding Route-1 through Route-4 fields are each null. In another embodiment, if there is no associated routing code for a TF number, then the entire record for the TF number may be omitted from the auxiliary routing database.

Record 500*d* shows a TF number with TF prefix "866" in the Toll Free Number field. The corresponding Route-1 field contains an Internet Protocol version 6 ("IPv6") IP address. The corresponding Route-2 through Route-4 fields are null. To one skilled in the art, it will be known how to route a call to a target telephony station having an IPv4 or IPv6 address.

Record 500*e* shows a TF number with TF prefix "844" in the Toll Free Number field. The corresponding Route-1 field contains a domain name associated with a target telephony station. The corresponding Route-2 through Route-4 fields are null. One skilled in the art will understand how to perform a domain name service ("DNS") lookup to covert the domain name to an IP address, and will further understand how to route the TF call to the IP address.

Record 500*f* shows a TF number with TF prefix "855" in the Toll Free Number field. The corresponding Route-1 and Route-2 fields each contain an alias name associated with a target telephony station. In this case, the routing server will perform a translation of an alias name to a routing code such as a CIC or an IP address. The routing server could perform such translation from dipping an alias name database, performing a further dip of the auxiliary routing database to find another instance of the alias name and routing code associated with it, could query an alias name server, or could translate the alias name from a table pre-loaded into routing server memory. In this record the corresponding Route-3 and Route-4 fields are null.

A number of other fields for populating the auxiliary routing table will be apparent to one skilled in the art. There may be a field indicating the priority in which the routing codes are to be used, a field with the date and time the routing code was last updated, a field(s) indicating the start or stop of a range of associated Toll Free Number field, and a field(s) indicating restrictions as to when certain routing codes can be used or not used, such as time of day or day of week. There may also be a field in the auxiliary routing database indicating the format of each routing code, such as CIC, IPv4, IPv6, domain name, or alias label format. Another field may be included and used for the coordination of syncing of information in a plurality of auxiliary routing databases. A field other than a date field may be used for the coordination and syncing of information in the auxiliary routing database with information in the SMS/800 database. In a future embodiment, the auxiliary routing database may be combined with the SMS/800 Database.

In one embodiment the routing codes may be prioritized for use by the routing server. They may be prioritized based on geographic parameters, network congestion, cost considerations, speed, redundancy or other considerations. The routing server may continually query network computers to determine if a route is inaccessible or slow, and based on such feedback, or lack of feedback, the routing server may dynamically update the priority of the routing codes in the auxiliary routing database. Routing codes may also be prioritized based on the time of the day, day of the week, or closeness in time to an external target event.

One skilled in the art will appreciate that a range or plurality of ranges of TF numbers may be updated at one time in the auxiliary routing database. The auxiliary routing database may be a relational database. Alternately, it may have customized record-based indexes to speed retrieval of routing codes and other information associated with the TF number. The auxiliary routing database can be updated manually or automatically.

The invention is not limited to the disclosed embodiments, but instead includes equivalent embodiments within the scope of this specification and claims. It is anticipated equivalent embodiments will be apparent to one skilled in the art.

What is claimed is:

1. A method of re-routing a toll free telephony call by a telephony service provider computing machine (Provider Machine) comprising:
 populating a first routing database with a plurality of target station identifiers, each associated with a target telephony station, and at least one carrier identification code (CIC) routing code associated with each said target station identifier;
 populating an auxiliary routing database with one or a plurality of said target station identifiers that match at least one or more said target station identifiers in said first routing database and further populating said auxiliary routing database with one or plurality of alternative routing codes per said target station identifier, where at least one of said alternative routing codes is an alternative routing code different from said CIC routing code in said first routing database;
 receiving at said Provider Machine said toll free telephony call containing a called target station identifier;
 having said Provider Machine automatically access from said first routing database one or a plurality of said CIC routing codes associated with said called target station identifier;
 having said Provider Machine automatically access from said auxiliary routing database one or a plurality of said routing codes associated with said called target station identifier;

using one said CIC routing code accessed from said first routing database as a primary routing code to automatically route said toll free telephony call from said Provider Machine to an electronic routing machine associated with said primary routing code;

routing said toll free telephony call from said electronic routing machine to said target telephony station associated with said called target station identifier;

receiving a call completion status indicator at said Provider Machine from said electronic routing machine; and using as an alternate routing code at least one said routing code differing from said primary routing code to automatically re-route said toll free telephony call from said Provider Machine to an alternate electronic routing machine associated with said alternate routing code in the event said call completion status indicator reveals to the Provider Machine said toll free telephony call did not successfully connect to said target telephony station.

2. The method of claim 1, wherein said target station identifier is a toll free telephone number.

3. The method of claim 1, wherein said alternate routing code is said alternative CIC routing code.

4. The method of claim 1, wherein said alternate routing code is an Internet Protocol address.

5. The method of claim 1, wherein said alternate routing code is a domain name.

6. The method of claim 1, wherein said electronic computing machine is an access tandem.

7. The method of claim 1, wherein said toll free telephony call is a long distance call.

8. The method of claim 1, wherein said toll free telephony call originates and terminates within the same LATA.

9. The method of claim 1, wherein said target telephony station is accessible by said electronic routing machine via a wide area network (WAN).

10. The method of claim 1, wherein said first routing database is an SMS/800 toll free database.

11. The method of claim 1, wherein said call completion status indicator is a 503 status code.

* * * * *